UNITED STATES PATENT OFFICE.

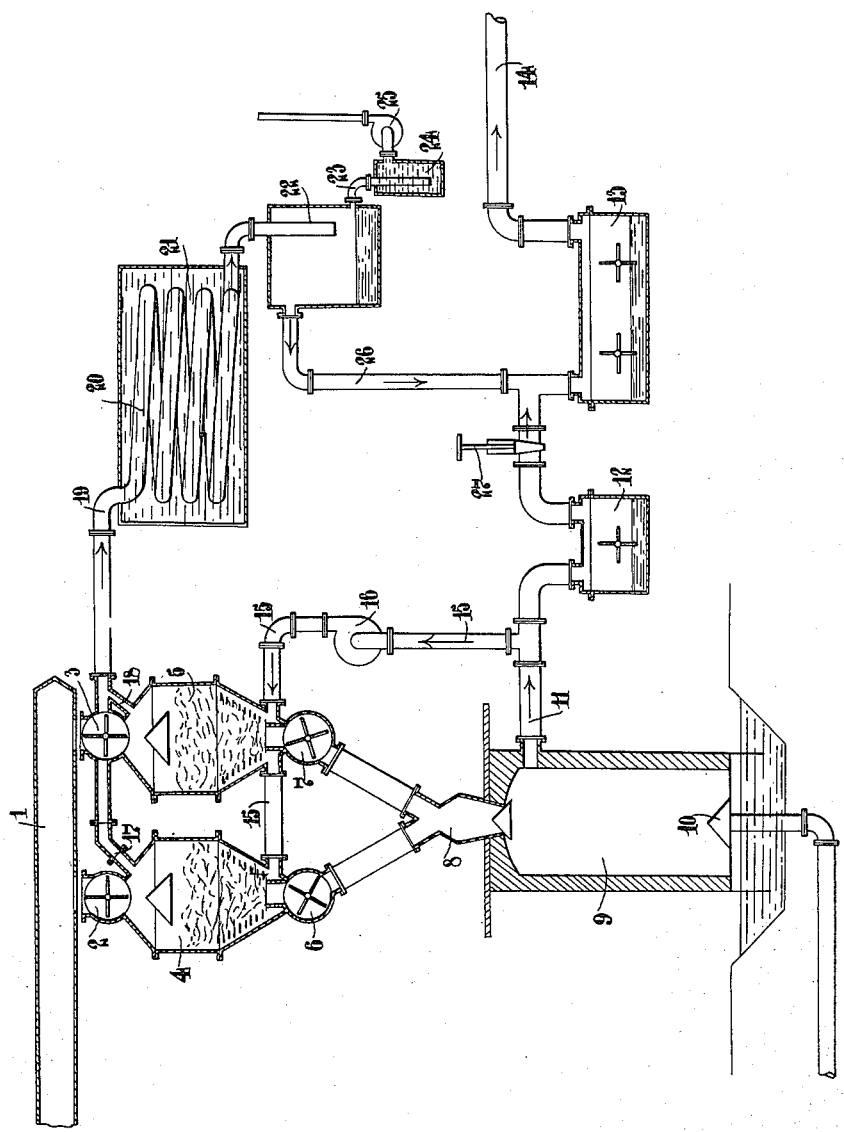

THOMAS RIGBY, OF DUMFRIES, SCOTLAND, ASSIGNOR TO WETCARBONIZING LIMITED, OF LONDON, ENGLAND.

UTILIZATION OF PEAT.

1,143,319.      Specification of Letters Patent.      Patented June 15, 1915.

Application filed January 23, 1915. Serial No. 4,071.

*To all whom it may concern:*

Be it known that I, THOMAS RIGBY, a subject of the King of Great Britain and Ireland, and residing at No. 61 Loreburn street, Dumfries, Scotland, have invented certain new and useful Improvements in and Relating to the Utilization of Peat, of which the following is a specification.

This invention relates to processes of peat utilization in which the cost of the process is sought in some measure at least to be met by obtaining from the peat chemical products of value and in its more specific form relates to processes of the kind wherein the peat is rendered available in a more or less dried condition by the agency of a process of heat treatment with or without the aid of chemical agents. Processes of this character depend upon the resulting destruction of the water binding matter in the peat and are described, for example, in British Patents numbered 10834 of 1903 and 17610 of 1911.

The object of the present invention is to provide processes by which relatively large quantities of such products, as well as products not usually available may be conveniently obtained, the consequent increased revenue from this source rendering possible the wider application than hitherto of such methods of peat utilization.

The invention consists in a process of obtaining waxy and other materials from peat according to which the peat, preferably rendered drier by processes of heat treatment of the kind above indicated, is subjected to a preliminary distillation at a temperature sufficient to effect evolution and removal of the waxy materials, the latter then recovered from the resulting gases, the treated peat subjected to a final gasification and the resulting producer gases then treated for the recovery of by-products.

I have found that although peat is capable of yielding up under suitable conditions of distillation firstly large quantities of valuable wax containing not only hydrocarbon of high melting point (say about $1\frac{1}{2}\%$ by weight of the dry peat) but also high melting point fatty acid (*e. g.*, a body which from its constants is cerotic acid or analogous body or bodies to the extent of about $2\%-3\%$ of the peat) itself also reducible to high melting point hydrocarbon, secondly, lesser but still substantial quantities of organic acids mainly acetic acid, and thirdly, methyl alcohol in appreciable quantity, as also other products. The usual conditions of gasification of the peat to yield power and fuel gas for such a process are, even if by-product recovery on the usual lines is adopted, unfavorable to the recovery of the materials in question. Thus, the separation of the bodies by condensation or otherwise from the relatively enormous volume of gas generated would place such a step of itself out of practical consideration, while much of the valuable materials, and especially of the wax, is decomposed under the conditions prevailing in the gas producer and lost.

It will be understood that the details of the process will necessarily depend in some measure upon the nature of the product or products to be recovered and the extent to which the particular peat treated contains or can yield the same but for the purposes of better illustration of the invention the same will be hereafter described (on the basis of my tests on a certain peat) in its relation to the obtaining from a peat of waxy matter as the chief product, as well as acetic acid, methyl alcohol, and recovery of the nitrogenous matter which passes from the peat during the distillation process.

I have found that the yield of peat wax and its character is largely dependent upon its rapid evolution from the material and upon its being rapidly removed from contact with the residue and in a particular instance distillation times and temperatures of 160 minutes at 210° C., 105 minutes at 250° C., 90 minutes at 360° C., and 50 minutes at 500° C., gave wax yields of 1.0%, 3.0%, 6.0% and 8.0% respectively upon the amount of peat treated (calculated dry). At the same time the yield of acetic acid, in the case in point some 1.5%, and that of methyl alcohol are less subject to influence by the nature of the treatment while as is to be expected the ammonia formation and the combustible value (at all times poor) of the fixed gas evolved increases with rising temperature. On the other hand a limit of temperature is soon reached after which the loss by decomposition of all these products becomes serious and it is doubtful, judging from the case in point, if a temperature much above 500° C. would be suitable from this standpoint, quite apart from its undesirability on account of the constructional difficulties the higher temperatures may lead to.

It should be borne in mind as a general consideration that although rapidity of evolution of the bodies referred to, whether induced by heat or rapidity of gas flow through the mass (as referred to below) or both, favors the yield thereof, considerable sacrifice in nitrogen fixation may occur in so doing, if pushed too far, on account of the conditions necessary for ammonia formation being then but poorly complied with.

It must not be forgotten that the gases present during the distillation may play an important part, as we have found, in determining the yield of by-products apart from the beneficial effect within limits that their mere velocity may have in sweeping the liberated products out of the reaction zone, and in this connection an abundance of steam or hydrogen in the gases exercises a beneficial effect on the ammonia formation which may at this stage correspond even to 25% of the whole of the nitrogen in the peat treated. Bearing these general indications in mind and remembering, as I have found to be the case, that of all the products the greater bulk and the least decomposed portion is evolved in the early stages even of the more rapid distillation it is easy to adapt the working conditions to particular circumstances.

In carrying out the process for example in conjunction with a peat preparing process described in British Patents Nos. 17610 of 1911 or 25146 of 1912, the plant is arranged in the manner indicated in the accompanying diagrammatic drawing, some of the parts being shown in section.

By means of a conveyer 1 the material in the form of press cakes or briquets or a mixture thereof is admitted through gas-tight valves 2 and 3, to retorts 4 and 5 respectively, which it leaves by way of the valves 6 and 7, and enters the hopper 8 of a gas producer 9, supplied with air and steam in the usual way through an inlet 10.

The gas generated in the producer leaves by a duct 11, and thereafter passes through washers 12 and 13, wherein the gas is scrubbed and treated for the recovery of ammonium sulfate, after which it is available for consumption at the outlet 14. Part of the producer gas is, however, diverted from the duct 11 through a duct 15, and forced by a fan 16 into the retorts 4 and 5, where it acts as a medium for heating the material and for driving off the gases of distillation, which pass from the retort by way of ducts 17 and 18, to a main duct 19, which terminates in a condenser coil 20 immersed in liquid in a tank 21. In this way wax and other condensable products in the distillation gases are condensed and caught in a vessel 22, from which they are taken off by a siphon 23, and sucked from a vessel 24 by a pump 25, to be thereafter treated for separation of their constituents. Meanwhile the treated gas passes from the vessel 22 by the duct 26 into the washer 13, where it is admixed with the producer gas to form a mixture resembling to a great extent that produced when the peat is gasified in the ordinary way. Where, however, it is not desired to produce an excess of producer gas, only part of the residue from the retorts 4 and 5 is gasified in the producer 9, and the gases from the latter are all utilized to heat the retorts, this being effected by closing a valve 27 situated in the duct between the washers 12 and 13, any excess of residue from the retorts being in such cases available as a smokeless fuel.

Steam, the amount of which may vary widely (in the instance particularly studied from 1 part by weight to 1 part of peat, to 6 parts by weight to 1 part of peat, although the best results were obtained by 2.5 parts of steam to 1 part of peat) and also hydrogen are, considered purely from the standpoint of avoidance of decomposition, the best media for effecting removal of the products from the reaction zone and also for effecting heating where internal heating is used. Where steam is accordingly employed the poor quality gas generated which is mainly carbon dioxid can advantageously be combined with the richer gas afterward generated in the producer from the partially distilled material to utilize the combustibles of the poor gas and obtain a mixture more nearly similar to gas generated under ordinary by-product recovery conditions. On the other hand the distillation gases after cooling say to 90°–100° C. to condense the waxy matters and after absorption, if desired, of acetic acid, may in a partially steam saturated condition be returned to the retorts and so continuously circulated, a certain proportion of the gas being at the same time continuously rejected from the system. As the methyl alcohol and similar matters are only easily recovered by more complete cooling than can conveniently be used in the latter system it is in most cases limited in its application to those instances in which the methyl alcohol and kindred materials can be neglected.

Where external heating of the retorts, heating of the gases or separate steam raising is adopted the products of combustion from the furnaces therefor may after having fulfilled their main duty be used in the peat supply system to assist in the drying operation and so to reduce the overall heat consumption.

Having now described my invention, what

I claim as new and desire to secure by Letters Patent is:—

1. A method of gasifying peat in which the distillation part of the process is carried out separately from that of decarbonization and the gases of distillation are treated for the recovery of by-products formed during distillation, while the gases of decarbonization are separately treated for the recovery of further by-products.

2. The method of treating peat by gasification involving distillation followed by decarbonization in which the distillation is carried out separately from the decarbonization and the gases of the former treated for the recovery of by-products formed during distillation while the gases of decarbonization are separately treated for the recovery of ammonia compounds.

3. A method of recovering wax and other by-products from peat consisting in subjecting the peat to distillation, treating the resulting gases for the recovery of substances such as wax rendered available during distillation, subjecting the solid residue of distillation to decarbonization and treating the resulting gas for the recovery of by-products.

4. A method of recovering wax and other by-products from peat consisting in subjecting the peat to heat treatment adapted to render its contained water more freely expressible, distilling the resulting material, treating the gases of distillation for the recovery of wax and other bodies rendered available by distillation, subjecting the solid residue of distillation to decarbonization and treating the resulting gas for the recovery of ammonia and other compounds.

5. A method of recovering wax and other by-products from peat consisting in subjecting the peat to distillation, treating the resulting gases for the recovery of substances such as wax rendered available during distillation, subjecting the solid residue of distillation to decarbonization, treating the resulting gas for the recovery of by-products and utilizing such gas for effecting the distillation and removal of the gases thereof.

6. A method of utilizing peat consisting in subjecting the peat to heat treatment adapted to render its water more freely expressible, subjecting the resulting material to distillation resulting in gas and a solid residue, treating the gas for the recovery of products rendered available by the distillation, subjecting part of the solid residue to gasification in the presence of steam and air, treating the resulting gas for the recovery of by-products, utilizing part of the gas to effect the distillation, and utilizing the remainder of the solid residue of distillation as a fuel.

In testimony whereof I have signed my name to this specification in the presence of two subscribing witnesses.

T. RIGBY.

Witnesses:
H. DUNWORTH,
J. E. DEXTER.